United States Patent [19]

Murr

[11] 4,094,239
[45] June 13, 1978

[54] APPARATUS FOR CUTTING HAY BALER TWINE

[76] Inventor: John Leroy Murr, R.F.D., Laplata, Mo. 63549

[21] Appl. No.: 728,523

[22] Filed: Oct. 1, 1976

[51] Int. Cl.² .......................................... B65B 13/02
[52] U.S. Cl. ..................................................... 100/5
[58] Field of Search .............................. 100/5, 13, 88

[56] References Cited

U.S. PATENT DOCUMENTS

| 2,468,641 | 4/1949 | Scranton | 100/5 |
| 2,829,585 | 4/1958 | Varvel | 100/5 |
| 3,884,138 | 5/1975 | Rice | 100/5 |
| 3,910,178 | 10/1975 | Eggers | 100/5 |
| 3,988,977 | 11/1976 | Anderson | 100/5 |

Primary Examiner—Billy J. Wilhite
Attorney, Agent, or Firm—Glen Simmons

[57] ABSTRACT

An apparatus for cutting hay baler twine comprised of a fixed blade and twine guide members secured to the baler frame by a blade and guide support. The blade, guide members and support are positioned in proximity to the path of a twine directing member so that as material is dispensed via the directing member as it moves along a path in the vicinity of a formed bale yet within the machine, the twine will be directed against the blade with the aid of twine guide members and thus severed from the twine supply.

8 Claims, 5 Drawing Figures

APPARATUS FOR CUTTING HAY BALER TWINE

BACKGROUND OF THE INVENTION

The invention relates to an apparatus for cutting hay baler twine after a bale has been formed and wrapped with twine from a twine dispensing mechanism on the baler. More specifically, the invention relates to a twine cutting mechanism which severs the bale twine simply by having the twine dispensing mechanism draw the twine over a fixed blade with the aid of twine directing means.

In the hay baling apparatus, such as that manufactured by the Vermeer Manufacturing Company, Hesston, New Holland and Massey Ferguson, the hay to be baled enters the baler between compression rollers and is wound onto itself by a plurality of belts so that cylindrical bales are formed.

Upon completion of the bale forming process, the operator then pulls, via rope, a spring loaded twine directing member across to the position where wrapping of the bale begins; then allows the directing member to be drawn back by spring action while distributing twine on the revolving bale. Upon completion of the wrapping process, the operator then, heretofore, via a second rope or cable causes the twine to be cut by a scissor action cutting mechanism. The operator then causes the tailgate to open, thus depositing the bale on the ground. Modifications of this basic system include activation of the cutting mechanism in response to the tailgate opening (see U.S. Pat. No. 3,884,138; issued to Jerry M. Rice on May 20, 1975, class 100 subclass 5.) Other modifications of the basic system above described include a variety of added mechanisms designed to increase the twine tension during the winding provided to facilitate cutting of the twine (see e.q., Eggers et al, U.S. Pat. No. 3,910,178; Oct. 7, 1975, class 100 subclass 5.) Another system has a scissoraction, cutting mechanism activated in response to twine tube movement.

The fact that the cutting mechanisms required either manual activation or an additional device to increase tension in facilitation of twine cutting has resulted in time waste and unnecessary complication of the baler and needless expense to the manufacturer and consumer.

Thus it is a principal object of the invention to provide an improved arrangement for hay baler twine cutting.

A further object is to provide a twine cutting arrangement which eliminates the need for the machine operator to manually operate the cutting mechanism.

A further object of the invention is to provide a twine cutting apparatus for a hay baler which eliminates the need for any twine tension increasing means.

A further object of this invention is to provide a twine cutting mechanism for a hay baler which may be sold as original equipment on balers or later installed on balers in the field.

A further object of the invention is to provide a cutting mechanism for baler twine which can be used on all round balers regardless of the size bale produced.

A further object of the invention is to provide a twine cutting mechanism for baler twine which mechanism is simple in design and operation, has no moving parts aside from the twine and can be made from standard shop items.

A further object of this invention is the provision of a baler twine cutting mechanism in which the cutting blade is readily accessible and replaceable when replacement is necessitated.

A further object of this invention is to provide a twine cutting mechanism which permits faster baler operation.

These and other objects will be apparent to those skilled in the art.

DESCRIPTION OF THE PREFERRED EMBODIMENT

Figure 1:
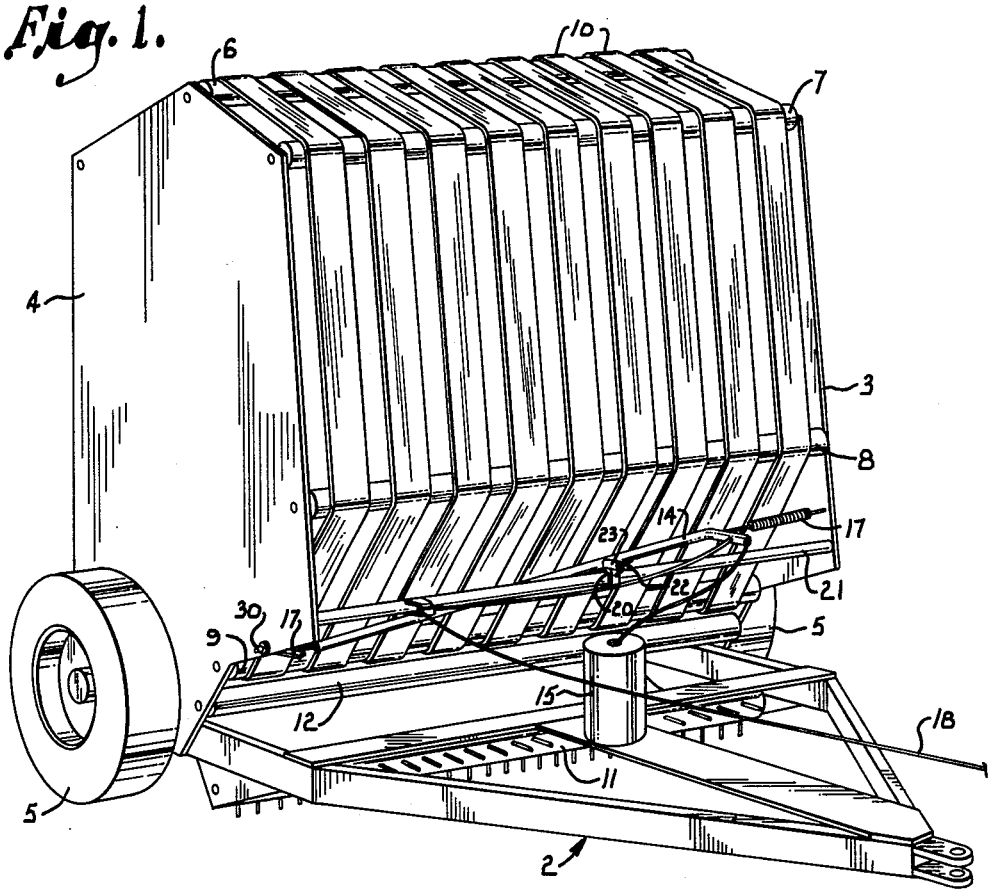
FIG. 1 is a perspective view of a hay baler employing the cutting apparatus of this invention mounted thereon.

In the drawings, the numeral 1 refers to round hay baler capable of producing large round bales in the order of 500 – 1600 pounds. Such balers are in wide use and are manufactured by several companies including the Vermeer Manufacturing Company, New Holland, Hesston and Massey-Ferguson. This invention may as well be employed on the heretofore popular Allis Chalmers small round balers. The baler 1 comprises a frame means 2, 3, 4 mounted on wheels 5. Secured to the frame means are rollers 6, 7, 8 and 9 and others not shown on which belts 10 rotate and inside which belts the round hay bale is formed after hay has been raised by pick-up 11 and fed into the interior chamber by entry between rollers 9 and 12. The baler is powered in the usual way by a power take-off from the tractor (not shown) which pulls the baler. Of course, the baler could be powered by its own power plant if desired.

Figure 4:
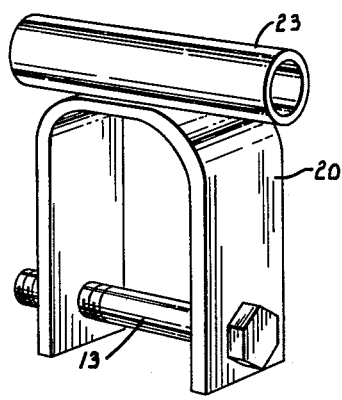
FIG. 4 is a perspective view of a movable clamp employed to mount a baler twine tube used with the invention.
Figure 5:
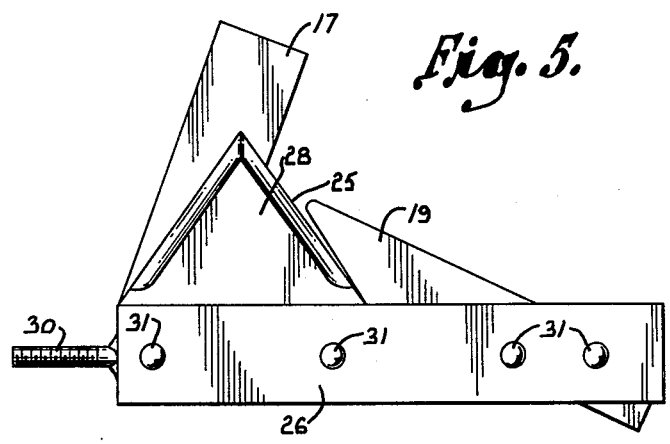
FIG. 5 is a rear view of the cutting assembly.

Twine tube 14 is pivotally mounted via an adjustable and movable clamp 20 to frame cross piece 21. A bolt-like extension 22 (see FIG. 2) is welded to the twine tube in perpendicular position thereto. The twine tube 14 is thus pivotally mounted on adjustable clamp 20 by inserting bolt-like extension 22 into a receiving tube 23 welded on clamp 20 and pinned therein. Clamp 20 is then clamped to frame cross piece 21 by tightening bolt 13 which extends through the jaws of clamp 20 as seen in FIG. 4.

Twine tube 14 provides a conduit through which twine is delivered from twine box 15 to the vicinity of rollers 9 and 12 between which twine is delivered to wrap the bale within the belts 10 as it rotates. Twine tube 14 is spring loaded at 17 and connected by rope 18 with the tractor drivers seat as shown in FIG. 2.

Figure 2:
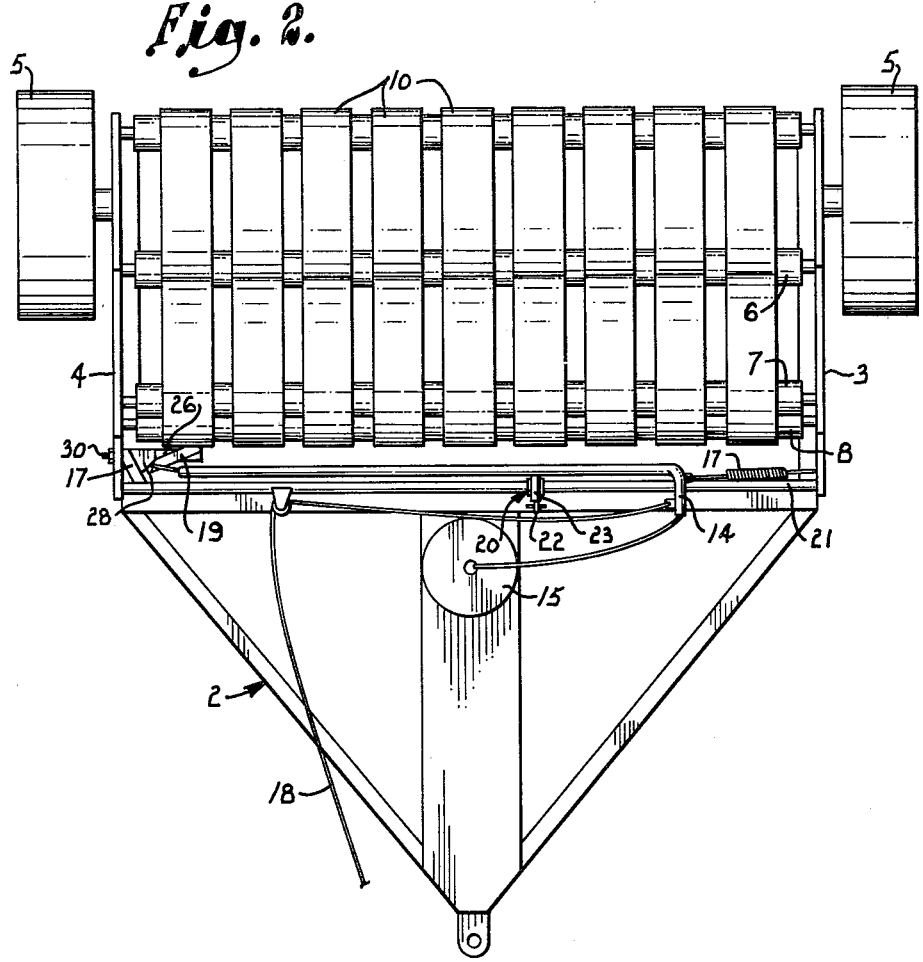
FIG. 2 is a simplified top view of a hay baler employing this invention.
Figure 3:
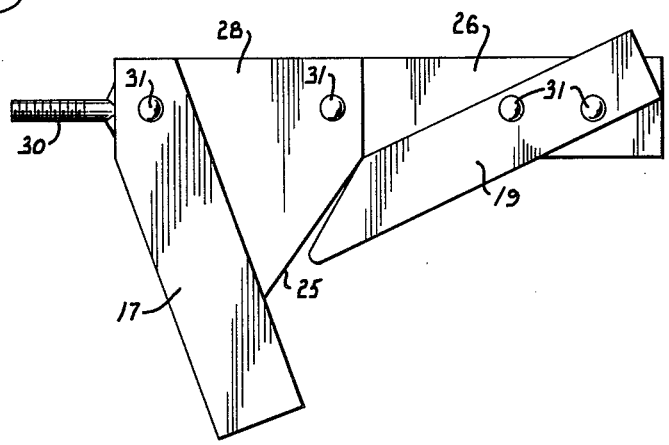
FIG. 3 is a front view of the cutting assembly of the invention.

Cutting assembly 17, 28, 19 and 26 is shown in the middle left area of FIG. 2 and in detail in FIG. 3. 28 refers to an individual, conventional, cutting blade section such as that commonly employed in farm hay mowers produced for example by the John Deere, International, Harvester and Allis Chalmers Companies. 17, 26 and 19 refer to conventional 1/8 × 1 inch metal stripping commonly available from hardward supply establishments. Cutting blade 28 as usual with section blades has two cutting edges; one at 25 as shown in FIG. 3 and another covered by strap 17. Cutting blade 28 and guide means 19 and 17 are riveted at 31 to metal strip support 26. Blade 28 and strip 19 are mounted directly to 26 while 17 is mounted on top of 28 and together with 28 riveted to 26. This assembly then is bolt-mounted to the baler frame as depicted in FIGS. 1 and 2 by bolt 30 in such position that as the twine tube moves across dispensing twine will be directed by guide means 17 and 19 against the blade 28 for cutting thereof. It should be noted that as seen in FIG. 3, an end of guide 19 is positioned directly against the cutting edge of blade 28 at a point close to strip 26 while 19 is separated somewhat laterally from blade 28 at a point remote from 26 such that a "v" shaped slot is formed between the end of strip 19 and blade 28.

OPERATION

Baler 1 is drawn through a hay field along a winrow of hay by a tractor, not shown. Hay is fed into baler 1 via pick-up 11 between rollers 9 and 12 into a bale forming chamber on the interior of belts 10. When the tractor-baler operator observes that the bale has been formed to the desired size, he terminates forward motion of the baler and tractor and simutaneously, via rope 18, as seen in FIG. 2, pulls twine tube 14 against spring 17 causing it to rotate counterclockwise, as seen in FIG. 1, approximately 135° to such point that the dispensing end of tube 14 is adjacent the right end of the hay baler intake area as seen in FIGS. 1 and 2. The last portion of hay entering the machine after the baler and tractor stop forward motion then catches the twine hanging from the dispensing end of tube 14 as it was left after cutting from the last bale formed, and draws it between rollers 9 and 12 into the bale forming chamber inside belts 10 where it is wound onto the bale as the bale continues to rotate. The operator then allows the twine tube 14 to be pulled clockwise by spring 17 and in so doing causes twine to be dispensed along the length of the cylindrical bale as it continues to rotate. As twine tube 14 reaches its extreme clockwise position as seen in FIG. 1 and the position show in FIG. 2, the twine, that is still being drawn into the baler between rollers 9 and 12 and wound onto the bale, comes into contact with guide 19 along the edge of which it rides until it reaches the end of 19 at which point it drops into the "v" shaped slot between blade 28 and guide 19. Further rotation of the bale causes the twine to be drawn along the cutting edge 25 of blade 28 and against the end of guide 19 until the twine is severed. Guide 17 serves to prevent the twine from overshooting the slot between 28 and 19 should a sudden movement of the twine tube tend to cause such to happen. Guides 17 and 19 further serve as safety shields effectively removing the possibility of a person coming in contact with the sharp edges of blade 28. After severance of the twine, the twine wrapped bale is then ejected from the baler through the opening of a tailgate (not shown) by the operator. This process is then repeated as the hay is baled and twine wrapped.

Therefore it can be appreciated that a novel twine cutting assembly is hereby provided which obviates the need for manual cutting or twine tension increasing mechanisms of the previous art. Further, it is apparent that this new cutting assembly automatically severs the twine without the operator doing other than pulling the twine tube across against spring 17 and then allowing the spring to pull said tube to its original position.

Further, when cutting edge 25 of section blade 28 becomes worn from extended use, it is an extremely simple matter to replace section blade 28 by clipping the rivets 31 which hold 17 and 28 to 26, inserting a new section blade 28 and rerivieting 17 and 28 to 26. This replacement process takes less than ten minutes of time, thus, the extremely simple cutting apparatus design facilitates at all times the presence of a sharp section blade to ensure severence of the twine as it encounters the exposed edge of blade 28 in the slot between 28 and 19.

Having thus described the invention what is claimed is:

1. An apparatus for wrapping a large round bale formed in a large round bale forming machine comprising:
   a. frame means of said large round bale forming machine;
   b. means operably associated with said frame means for containing a supply of wrapping material;
   c. a material directing member adapted to dispense said material;
   d. means for mounting said member to said frame means in the vicinity of said large round bale;
   e. means operably associated with said member for moving said member whereby material is dispensed from said member along a path in the vicinity of the round bale under conditions wherein said member is moving in such way as to feed said material around said bale;
   f. cutting means having no moving parts positioned along said path for cutting said material solely upon said material being directed against said cutting means by said directing member, said material being fed unimpededly from said supply to said material directing member and unimpededly from said member to said bale for wrapping.

2. Apparatus as set forth in claim 1 wherein said cutting means includes a conventional farm mower section blade.

3. Apparatus as set forth in claim 2 wherein said cutting means further includes a support on which said section blade is mounted.

4. Apparatus as set forth in claim 3 wherein said cutting means further includes guide means for directing said material against said blade.

5. Apparatus as set forth in claim 3 wherein said cutting means further includes plural guide means for directing said material against said blade.

6. Apparatus as set forth in claim 1 wherein said means for mounting said member to said frame means comprises means for adjustably mounting said member on said frame means.

7. An apparatus for wrapping a round bale formed in a round bale forming machine comprising:
   a. frame means of the round bale forming machine:
   b. means operably associated with the frame means for containing a supply of wrapping material;
   c. a material directing member adapted to dispense said material;
   d. means for mounting said member to said frame means in the vicinity of the round bale, said means for mounting said member to said frame means comprises means for adjustably mounting said member on said frame means, said adjustable mounting means comprising a u-shaped means having tube means mounted thereon;
   e. means operably associated with said member for moving said member whereby material is dispensed from said member along a path in the vicinity of the round bale under conditions wherein said member is moving in such way as to feed said material around said bale;

f. cutting means positioned along said path for cutting said material solely upon said material being directed against said cutting means by said directing member.

8. Apparatus as set forth in claim 7 wherein said directing member is pivotally mounted in said tube means.

* * * * *